Feb. 24, 1931.  W. A. BARRY  1,794,136
WALKING TOY
Filed June 21, 1928
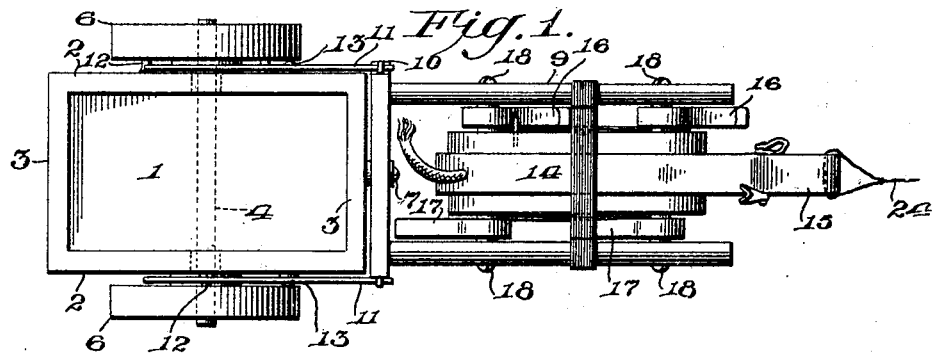
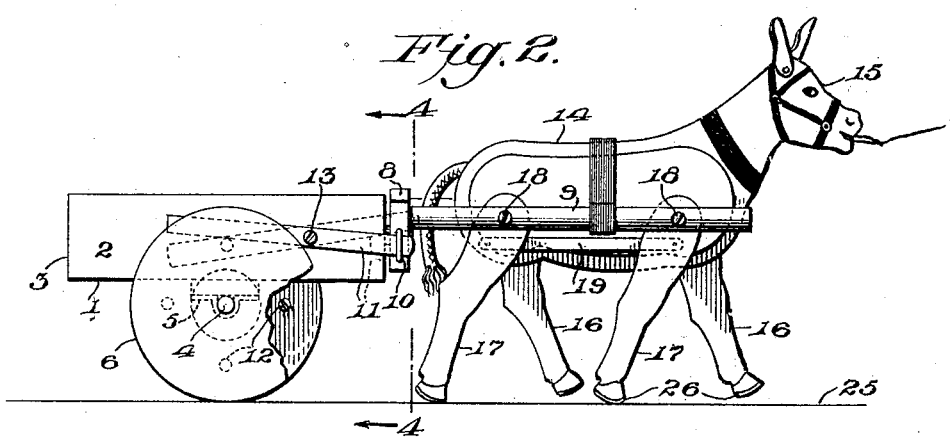
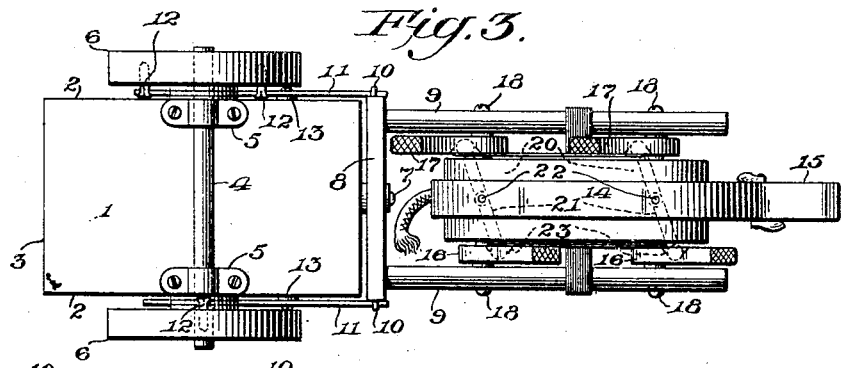
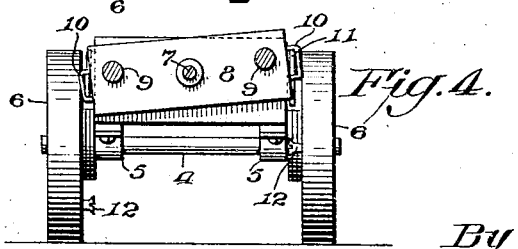
Inventor
William A. Barry,
By
J. Stuart Freeman,
Attorney
Witness:

Patented Feb. 24, 1931

1,794,136

UNITED STATES PATENT OFFICE

WILLIAM A. BARRY, OF PHILADELPHIA, PENNSYLVANIA

WALKING TOY

Application filed June 21, 1928. Serial No. 287,338.

The object of the invention is to provide improvements broadly in toys, but more especially in toys which include representations of animals, birds, men, or other elements, which as they progress along a given surface act through a cycle of movements which are referred to as and resembling walking in the case of horses, cows, mules, and similar quadrupeds, birds, men and other bipeds, and which in the case of ships and similar inanimate things are referred to as rolling.

Thus, this invention anticipates the provision of novel means for simulating the walking or rolling movement of many types of automata, but for the purpose of illustration the accompanying drawings show only a horse as an example of such bipeds, quadrupeds and inanimate objects, while references to an automaton include all objects having two or more legs or other laterally disposed portions, designed to come into alternate proximity or actual contact with the surface upon which they are manipulated, so that figures representing men and birds of various sorts fall within the scope of the invention in its broadest conception.

More specifically the object is to provide a body such as a cart or the like with wheels and so mounted that as it progresses along a given surface it remains in a transversely fixed relation with respect to such surface, while on the other hand the automaton which apparently pulls or pushes the cart is oscillated angularly with respect to the cart and supporting surface transversely of its line of progress, so that the laterally positioned legs or equivalent portions of the automaton upon opposite sides of the latter alternately come into engagement with or proximity to the said surface.

A further and more detailed object is to pivotally associate such automaton with a cart or the like supported by wheels, and then to provide means such as laterally disposed levers connecting the automaton or its immediate pivoted support with alternately positioned shoulders, projections, or eccentrics, carried by the wheels (or at least rotatable in synchronism therewith), whereby movement of the device upon a given surface causes the wheels in frictional engagement with such surface to rotate, and thereby tilt or laterally oscillate the automaton or its immediate support in such manner that the legs or the like carried by the latter engage the surface upon the opposite sides alternately, while the cart itself or other body member moves in a plane parallel with said surface.

With these and other objects in mind, the present invention comprises further details of construction and operation which are fully brought out in the following description when read in conjunction with the accompanying drawings in which Fig. 1 is a top plan view of one embodiment of the invention; Fig. 2 is a side elevation of the same; Fig. 3 is a bottom plan view of the same; and Fig. 4 is a vertical section on the line 4—4 of Fig. 2.

Referring to the drawings, a body member is shown as comprising a cart body having a bottom 1, side walls 2, and end walls 3. Transversely across the underside of the bottom 1 there extends a rotatable shaft 4, supported by trunnions 5 and having wheels 6 secured to its opposite ends.

To the foremost of the end walls 3 there is pivotally secured at 7 a swingletree or yoke 8, for the opposite end portion of which there extend forwardly, parallel shafts 9, while the end portions of said yoke are also provided with staples 10, or the like, through which loosely extend the forward free end portions of levers 11, which, at their opposite ends, alternately cooperate with screws or other suitable projections or shoulders 12 carried upon the adjacent surfaces of the wheels 6, said levers intermediate of their end portions being pivotally secured at 13 to the sides 2 of said body member.

The figure shown represents a horse or other quadruped which is intended to represent an animal pulling the cart, though the animal could well be easily reversed so as to appear to be pushing the cart instead of pulling the same. This animal figure comprises a body 14, with head 15, and pairs of depending legs 16 and 17 upon the laterally opposite sides of the body and pivotally connected to said body and to the respective shafts 9 by means of pivot pins 18. The legs upon each side of the animal's body are connected together by links 19 to insure the legs of each pair moving simultaneously in the same direction. On the other hand, through the animal body 14 there extend bores 20, through which in turn extend bars 21 fixed pivotally at their central portions 22 and having their free end portions engaging the legs of the opposite pairs in any suitable manner such for instance as within the sockets 23.

With this construction, it will be noted that as the toy as a unit is drawn by means of the string 24 or otherwise, the cart or other body member moves in a given plane at all times substantially parallel with the surface 25 which represents the ground, a street, sidewalk, or the like. However, as the wheels 6, in frictional engagement with the surface 25, rotate together with their supporting shaft 4, the irregularities, shoulders or other form of projections 12 upon said wheels or axle and positioned in staggered relation, impinge against the rear end portions of the levers 11 alternately, with the result that as one of the projections 12 engages the neighboring lever 11, the forward end of that lever is forced downwardly, thereby depressing the adjacent end of the yoke 8 and tilting the body 14 of the animal, so that the legs 17 cooperate with the surface 25 while the legs 16 are raised clear of said surface and the forward end of the other of said levers is likewise raised, with the result that its opposite end is depressed and is in a suitable position in the path of the next projection 12 carried by the other of the wheels 6 to be engaged thereby and actuated so as to tilt the animal figure towards the opposite side.

By properly proportioning the radii of the wheels 6, the distance of the projections 12 from the axis of said wheels, the length of the legs 16 and 17 and the connections between them, it will be found that the legs 17 move rearwardly in engagement with the surface 25 in exact accordance with the speed of rotation of the wheels 6 and that the legs 16 come into contact with said surface after the proper interval and likewise in contact with said surface move rearwardly, and simultaneously force the legs 17 forwardly through the link or lever motion provided through the medium of the bars 21. Thus the animal figure continues to simulate walking by being tilted alternately from side to side so that its oppositely disposed legs cooperate with the surface over which it is being drawn, while at all times the body member remains substantially level.

It is to be noted that in order to insure the frictional engagement between the legs and the surface beneath them, the hoofs or feet may be provided with rubber or any other suitable material or friction-increasing surface 26. Furthermore, the levers 11 may be connected to the yoke 8 in any desired manner; instead of two rods 21, only one end may be employed; instead of screws 12 illustrating the projections specified, any other suitable irregularities or, indeed, a cam may be employed to perform the function described; together with many other changes as to minor details without departing from the principles of the invention or the scope of the appended claims.

Having thus described my invention, what I claim and desire to protect by Letters Patent of the United States is:—

1. The combination of a receptacle, a rotatable support therefor having sets of irregularities in relative staggered relation, an automaton, a transversely extending support for said automaton pivotally connected with said receptacle, and levers pivoted intermediate of their ends and operatively connecting said last-named support with the irregularities of said sets alternately, whereby movement of said first support upon a given surface causes said automaton support to oscillate transversely of its pivotal axis in a manner opposite to that if said automaton support were connected directly to said irregularities.

2. The combination of a receptacle, a rotatable support therefor comprising a pair of wheels provided with irregularities in relative staggered relation, an automaton pivotally connected to said receptacle, and pivoted levers each having one end portion operatively connected to said automaton and its other end portion alternatingly engaging said irregularities, whereby a transversely oscillatory motion is imparted to said automaton by the rotation of said wheels as said receptacle moves upon said surface in a given plane in a manner opposite to that if said automaton support were connected directly to said irregularities.

3. The combination of a receptacle, a pair of wheels fixed to an axle so as to rotate in unison, and provided with projections alternately arranged upon the respective wheels circumferentially, an automaton pivotally connected to said receptacle, and levers connected to said automaton at one end and at their opposite ends engaging said projections alternately, so as to impart to said automaton an oscillatory motion about its pivotal support, as said receptacle moves in a relatively fixed plane and said wheels rotate.

4. The combination of a body member, a pair of wheels fixed to an axle so as to rotate in unison and providing a support for said member, said wheels being provided with circumferentially arranged irregularities, the positions of which are staggered upon one wheel with respect to the other, an automaton means to pivotally support said automaton with respect to said body member, and a pair of levers pivotally carried by said member and at their respective opposite ends pivotally connected to the adjacent ends of said automaton supporting means and bearing against the staggered irregularities upon said wheels alternately as said wheels rotate.

In testimony whereof I have affixed my signature.

WILLIAM A. BARRY.